(12) United States Patent
Adams et al.

(10) Patent No.: US 12,031,434 B1
(45) Date of Patent: Jul. 9, 2024

(54) SYSTEM AND METHOD FOR SPACE RESOURCE MINING AND MANEUVERING

(71) Applicant: LUNAR RESOURCES, INC., Houston, TX (US)

(72) Inventors: Robert B. Adams, Huntsville, AL (US); Peter A. Curreri, Huntsville, AL (US)

(73) Assignee: Lunar Resources, Inc., Houston, TX (US)

( * ) Notice: Subject to any disclaimer, the term of this patent is extended or adjusted under 35 U.S.C. 154(b) by 354 days.

(21) Appl. No.: 17/591,052

(22) Filed: Feb. 2, 2022

Related U.S. Application Data

(60) Provisional application No. 63/145,149, filed on Feb. 3, 2021.

(51) Int. Cl.
*E21C 51/00* (2006.01)
*B64G 1/10* (2006.01)
*B64G 1/40* (2006.01)

(52) U.S. Cl.
CPC .............. *E21C 51/00* (2013.01); *B64G 1/105* (2013.01); *B64G 1/405* (2013.01); *B64G 1/1071* (2023.08)

(58) Field of Classification Search
CPC .... F03H 1/0062; F03H 1/0068; F03H 1/0075; E21V 51/00; E21C 51/00
See application file for complete search history.

(56) References Cited

U.S. PATENT DOCUMENTS

| 9,187,191 B1 | 11/2015 | Jensen et al. |
| 9,266,627 B1 | 2/2016 | Anderson et al. |
| 9,581,021 B2 | 2/2017 | Ethridge |

FOREIGN PATENT DOCUMENTS

| RU | 2586437 | 10/2016 |
| WO | 2016/172647 | 10/2016 |

OTHER PUBLICATIONS

Schubert "Plasma Extraction of Metals in Space" (Year: 2019).*

* cited by examiner

*Primary Examiner* — Arun Goyal
*Assistant Examiner* — William L Breazeal
(74) *Attorney, Agent, or Firm* — C. Tumey Law Group PLLC

(57) ABSTRACT

A system and method for space resource mining and maneuvering may utilize at least one linear transformer driver, a selective ionization plasma pyrolysis extractor, and at least one pulsed plasma thruster.

36 Claims, 4 Drawing Sheets

SYSTEM AND METHOD FOR SPACE RESOURCE MINING AND MANEUVERING

RELATED APPLICATION

This application claims the benefit, and priority benefit, of U.S. Provisional Patent Application Ser. No. 63/145,149, filed Feb. 3, 2021, the disclosure and contents of which are incorporated by reference herein in their entirety.

ORIGIN OF INVENTION

The invention described herein was made by employees of the United States Government and may be manufactured and used by or for the Government of the United States of America for Governmental purposes without the payment of any royalties thereon or therefor.

BACKGROUND OF THE INVENTION

Field of the Disclosure

The disclosure pertains generally to the field of space exploration, more particularly to the extraction of resources from planetary bodies including moons, asteroids, comets and other associated bodies. Mining of planetary bodies may be beneficial to mankind. Mining of planetary bodies is the process of extracting raw materials from the planetary bodies while in space. In this regard planetary bodies, such as, for example, asteroids and/or minor planets are often rich in raw materials. For example, planetary bodies may comprise regolith, rock, water, methane, carbon dioxide, oxygen and other volatiles, as well as many other types of resources.

BRIEF SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one exemplary embodiment, the space resource mining and maneuvering system for use upon a planetary body may comprise: at least one linear transformer driver; and a selective ionization plasma pyrolysis extractor.

In another exemplary embodiment, the system for space resource mining upon a planetary body may comprise: a spacecraft; at least one linear transformer driver and a selective ionization plasma pyrolysis extractor.

In another exemplary embodiment, a method for space resource mining and maneuvering upon a planetary body having a layer of regolith may comprise: providing a spacecraft, associating with the spacecraft at least one linear transformer driver; associating with the spacecraft a selective ionization plasma pyrolysis extractor having at least two cathodes; utilizing the at least one linear transformer driver to heat at least a portion of the regolith to a temperature high enough to evaporate and ionize the regolith into a high temperature plasma containing metallic ions; and cooling the at least two cathodes to solidify and deposit a layer of some of the metallic ions upon the cooled electrodes. In one embodiment a portion of the regolith is heated to at least 4000K to evaporate and ionize the regolith.

BRIEF DESCRIPTION OF THE DRAWING

The present system and method for space resource mining and maneuvering may be understood by reference to the following description taken in conjunction with the accompanying drawing, in which.

Figure 1:
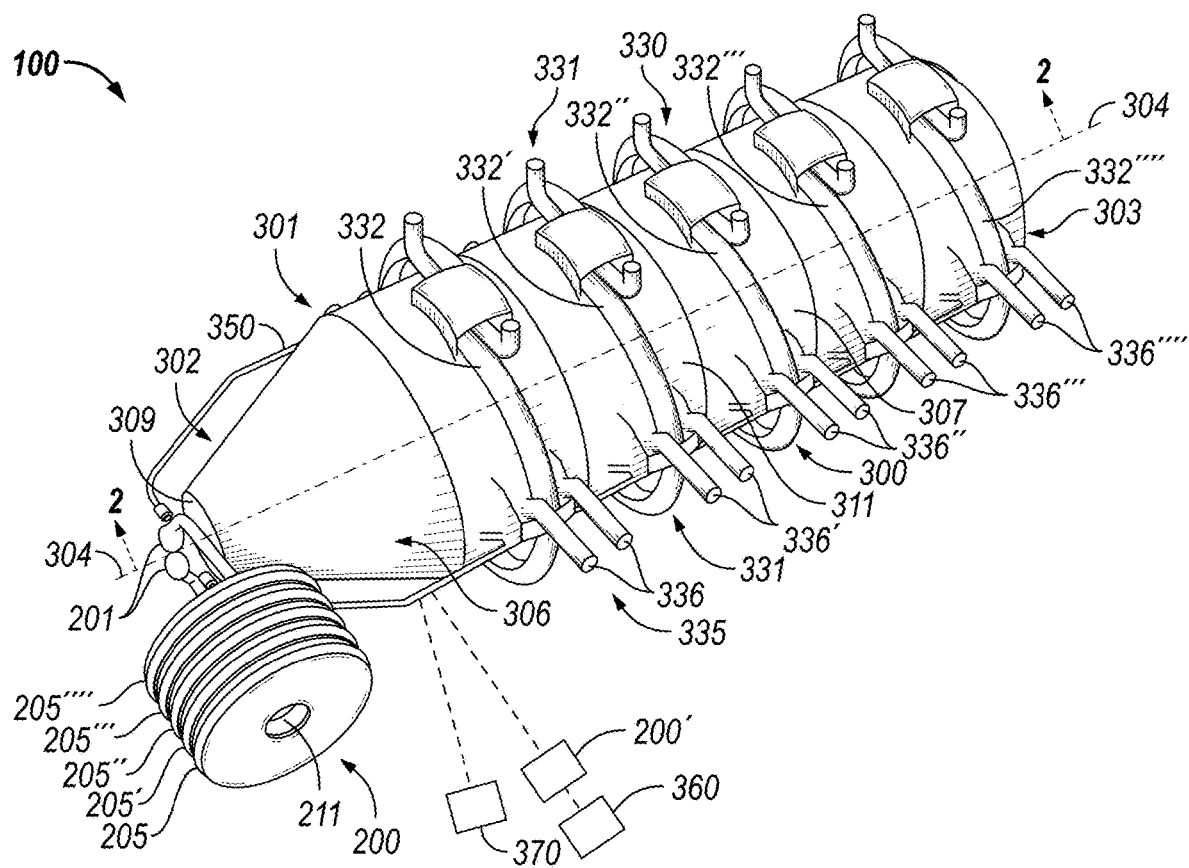
FIG. 1 is a perspective view of a space resource mining and maneuvering system in accordance with an illustrative embodiment of the invention.

While certain embodiments of the present system and method for space resource mining and maneuvering will be described in connection with the present exemplary embodiment shown herein, it will be understood that it is not intended to limit the invention to those embodiments. On the contrary, it is intended to cover all alternatives, modifications, and equivalents, as may be included within the spirit and scope of the invention as defined by the appended claims. In the drawing figures, which are not to scale, the same reference numerals are used throughout the description and in the drawing figures for components and elements having the same structure, and primed reference numerals may be used for components and elements having a similar function and construction to those components and elements having the same unprimed reference numerals.

DETAILED DESCRIPTION OF THE EXEMPLARY EMBODIMENTS

It should be understood that, although an illustrative implementation of one or more exemplary embodiments are provided below, the various specific exemplary embodiments may be implemented using any number of techniques known by persons of ordinary skill in the art. The disclosure should in no way be limited to the exemplary embodiments, drawings, and/or techniques illustrated below, including the exemplary designs and implementations illustrated and described herein. Furthermore, the disclosure may be modified within the scope of the appended claims along with their full scope of equivalents.

In this disclosure, the term "planetary body" refers to a natural celestial object of any size including, but not limited to, asteroids, rocks, comets, moons, planets and other objects. The term "regolith" refers to a layer of loose heterogeneous superficial material covering a planetary body or frozen layer. Typically the regolith includes rock particles and dust that covers the solid crust or core of a planetary body (e.g., moon, planet, asteroid, or comet).

As an example, on the lunar surface of the moon of the planet Earth, there are abundant resources such as oxygen and metals found in the regolith of the moon. Elements present on the lunar surface include, among others, hydrogen, oxygen, silicon, iron, magnesium, calcium, aluminum, manganese, and titanium. Mining of planetary bodies may be beneficial for a number of reasons. For example, the mined resources may be used for space construction, sustainment of astronauts on site and rocket propellant. This reduces the mass of resources that must be launched from Earth. Using resources gathered during space exploration is oftentimes referred to as in-situ resource utilization.

Figure 2:
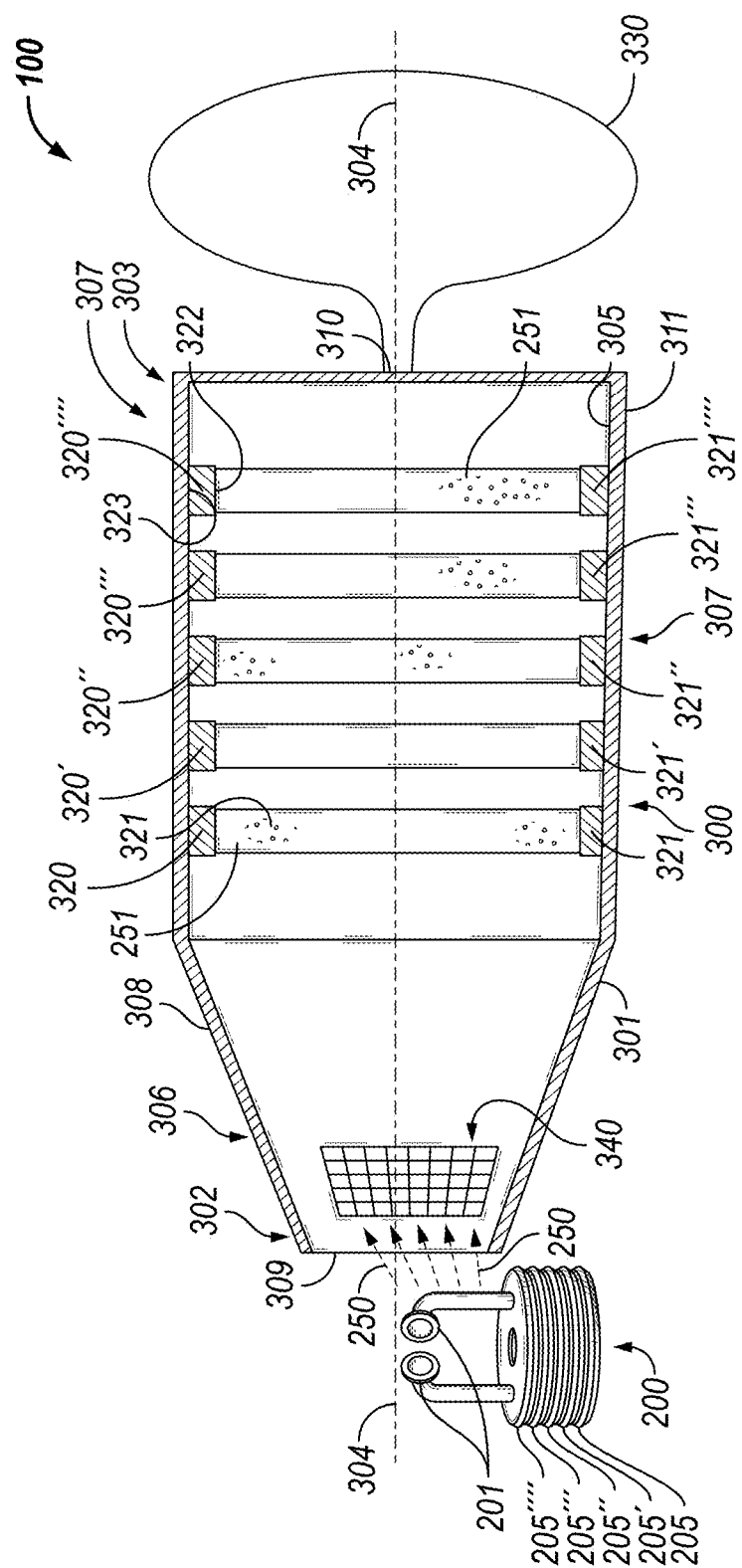
FIG. 2 is a partial cross-sectional view of the system of FIG. 1 taken along line 2-2 of FIG. 1.

With reference to FIGS. 1 and 2, a space resource mining and maneuvering system 100 for use upon a planetary body, such as the moon 900 having a layer of regolith 901 (FIG. 3), in accordance with an illustrative embodiment is shown. The system 100 generally includes at least one linear transformer driver 200, hereinafter "LTD," and a selective ionization plasma pyrolysis extractor 300, hereinafter "SIPPE". The system 100 may be used in a space environment upon the surface of a planetary body, such as the moon 900, or upon an asteroid, or other planetary body. The LTD includes at least two electrodes 201, which upon being powered and placed in contact with, or in proximity of, the regolith (901, FIG. 3), can heat at least a portion of the regolith 901 to a temperature high enough to evaporate and ionize the regolith into a high temperature plasma, shown schematically by arrows 250 in FIG. 2, which contains positively charged metallic ions, and other constituent ions, such as silicon, shown schematically at 251. The minimum temperature to heat the regolith 901 to evaporate and ionize it into a high temperature plasma is dependent upon the composition of regolith 901. In one embodiment a portion of the regolith 901 may be heated to at least 4000K, and up to 10,000K to evaporate and ionize the regolith 901.

Still with reference to FIGS. 1 and 2, the SIPPE 300, includes a housing 301, associated with the LTD 200. The housing has: first and second ends 302, 303; a longitudinal axis 304; a first portion 306 of housing 301 disposed adjacent the first end 302 of housing 301; a second portion 307 of housing 301 disposed intermediate the first and second ends 302, 303 of housing 301; and the first end 302 of housing 302 having an entrance, or opening, 309 through which the high temperature plasma 250 enters the housing 301.

At least two cathodes 320 (FIG. 2), charged to a negative voltage, are provided and disposed within the housing 301 in a spaced relationship from each other along the longitudinal axis 304 of the housing 301. A source of coolant 330 is provided to cool the cathodes to approximately 500K and is associated with the housing 301. Preferably the source of coolant 330 cools the cathodes to a temperature of approximately 500K. The coolant 330 may be water or any other coolant capable of cooling the cathodes to 500K. Upon the high temperature plasma 250 flowing into and through the housing 301, layers of some of the metallic ions 251 and other constituent ions solidify and are deposited upon the at least two cooled cathodes 320. The layers of some of the metallic ions 251 and other constituent ions which have solidified and been deposited upon the cooled cathodes 320, upon ceasing the operation of the at least one LTD 200, may be removed by any suitable device, such as a scraper, or rotating blades, not shown, which removes the cooled layers of the metallic ions from the cooled cathodes 320 as various different powders of the metallic ions. The second end 303 of the housing 301 includes an exit, or exit opening, 310 in communication with a storage, or gas collection, container 330, which may be flexible bladder. Any other materials which do not solidify upon the cooled cathodes 320, such as oxygen, may pass through housing 301 and exit 310 into the storage container 330.

Still with reference to FIGS. 1 and 2, the housing 301 is disposed adjacent the LTD 200 in communication with the entrance, or opening, 309 of the housing 301. The second portion 307 of the housing 301 preferably has a substantially cylindrical cross-sectional configuration, although other cross-sectional configurations could be used if desired. The first portion 306 of the housing 301 preferably has a cone shape, or cone shaped, configuration with an outer wall surface 308 that tapers upwardly from the entrance 309 of housing 301 toward the second portion 307 of the housing 301. The second portion 307 of housing 301 contains the at least two cathodes 320 and the SIPPE 300, with five cathodes 320, 320', 320", 320''', 320'''' being illustrated. The cathodes 320 are preferably ring-shaped members 321, each having an inner wall surface 322 and an outer wall surface 323. The outer wall surfaces 323 of the cathodes 320 are disposed adjacent the interior wall surface 305 of the second portion 307 of housing 301. The plurality of cathodes 320 are axially spaced from each other along the longitudinal axis 304 of housing 301, and each of the cathodes 320, or ring-shaped members 321, 321', 321", 321''', 321'''', are disposed in a plane which is substantially perpendicular to the longitudinal axis 304 of housing 301. If the cross-sectional configuration of the second portion 307 of housing 301 is other than cylindrical, the at least two cathodes 320 could be provided with a cross-sectional configuration, other than ring-shaped, that conforms to the cross-sectional configuration of the cathodes 320.

Still with reference to FIGS. 1 and 2, the source of coolant 330 for the cathodes 320 of the SIPPE 300 is associated with the exterior wall surface 311 of the second portion 307 of housing 301. Preferably, the source of coolant 330 is a coolant manifold 331 disposed upon the exterior wall surface 311 of housing 301. The coolant manifold 331 may have a radiator (not shown) associated with it, which may radiate excess heat from coolant manifold 331 to space. The coolant manifold 331 is preferably a plurality of pipes 332, 322', 322", 322''', and 322'''', with one set of pipes 332 for each cathode 320, 320', 320", 320''', and 320''''. Each of the pipes 332 are associated with a cathode 320 in a heat transmitting relationship which cools each cathode to 500K. An extraction manifold 335 may also be associated with the second portion 307 of the housing 301 of the SIPPE 300 for removal of the metallic ions 251 which have been removed from the cathodes 320 as previously described. The extraction manifold 335 may be a plurality of pipes 336, 336', 336", 336''', 336'''' in communication with the interior of the second portion 307 of housing 301. The extraction manifold 335 may have a radiator or radiator surface (not shown) associated with it, which may radiate excess heat from extraction manifold 335 into space.

Still with reference to FIGS. 1 and 2, a gridded ion accelerator 340 is disposed within the cone-shaped first portion 306 of the housing 301. The gridded ion accelerator 340 is electrically charged whereby it pulls the metallic ions 251 of the plasma 250 into the entrance, or opening, 309 of the housing 301 of the SIPPE 300. The entrance, or opening, 309 of the housing 301 is disposed adjacent the at least one LTD 200, with the at least two electrodes 201 of the at least one LTD 200 being in a closely spaced relationship with the entrance, or opening, 309 of housing 301. At least one plasma contactor 350 as are known in the art, may be associated with the SIPPE 300 to remove any free electrons from the high temperature plasma 250 formed by the at least one LTD 200. As shown in FIG. 1 a plasma contactor 350 is disposed adjacent the electrodes 201 of the LTD 200. If desired, the LTD 200 may be dissociated from the housing 301 of the SIPPE 300, or system 100 may be provided with an additional LTD 200'. Either LTD 200 or LTD 200' may be associated with at least one pulsed plasma thruster 360 as are known in the art, shown schematically in FIG. 1. Upon powering the LTD 200 or LTD 200' and the pulsed plasma thruster 360, the system 100 may be maneuvered in space by the pulsed plasma thruster 360.

If desired, the at least one LTD 200 and the SIPPE 300 of system 100 may be associated with a roving vehicle, or rover, shown schematically at 370 in FIG. 1, with the system 100 mounted upon the roving vehicle 370. Examples of a rover would be the lunar rover or Moon Rover previously used on the moon by NASA or the Mars Rover, or similar vehicles.

Figure 3:
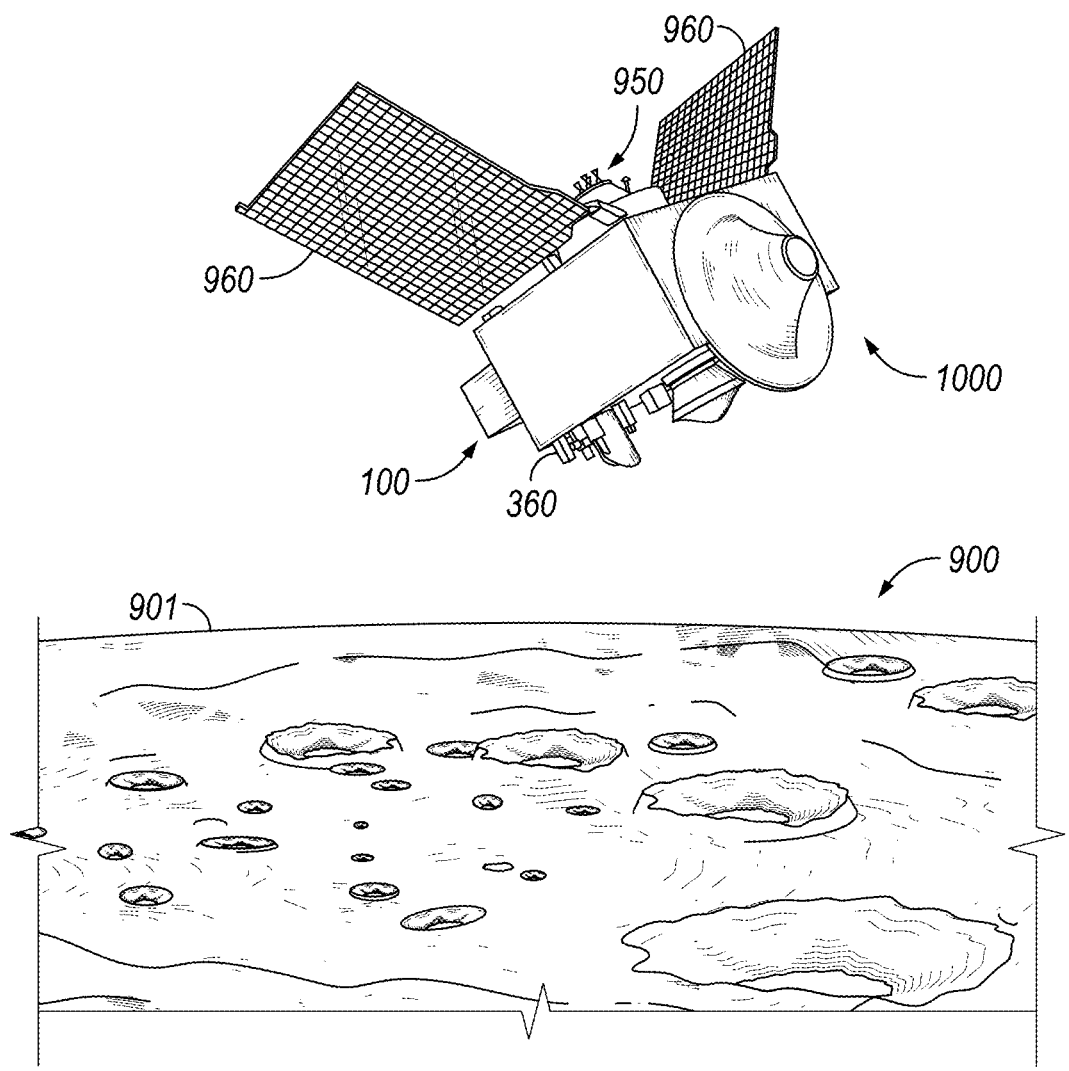
FIG. 3 is a perspective view of a spacecraft which may be used with the system of FIG. 1, the spacecraft appearing above a planetary body such as the Moon.
Figure 4:
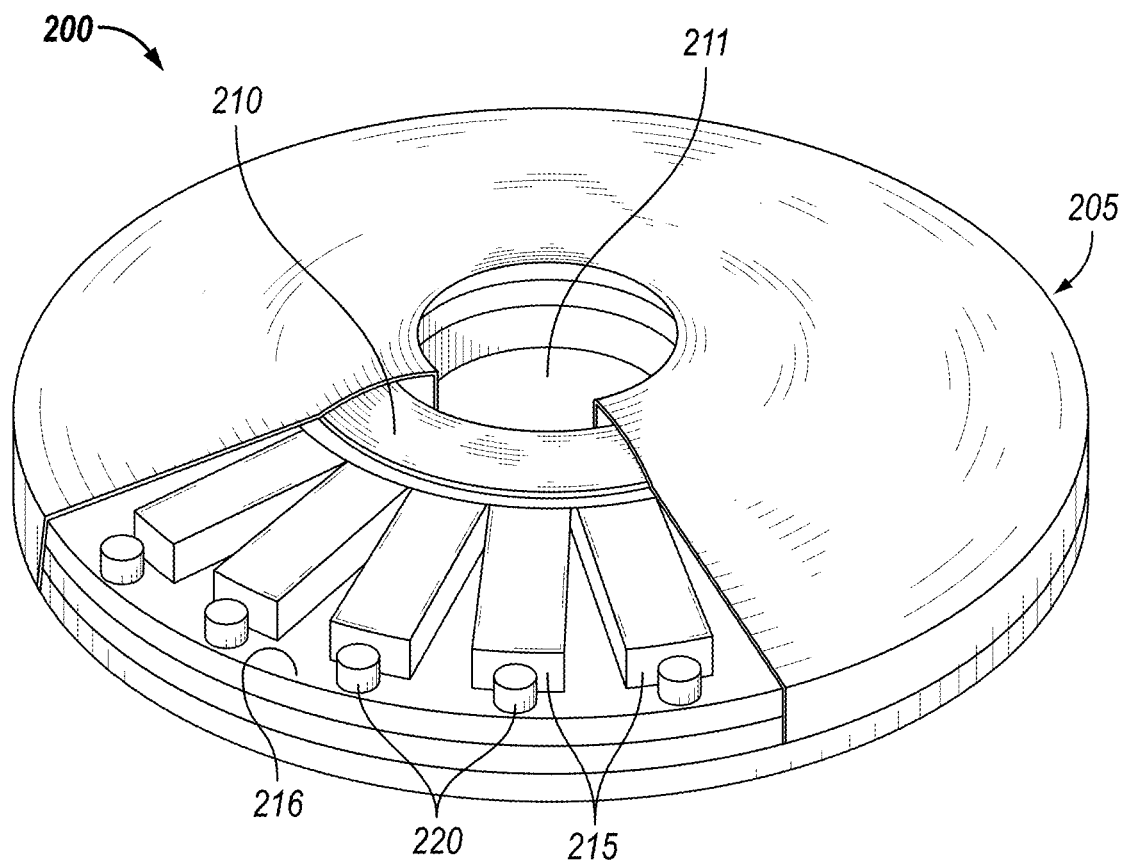
FIG. 4 is a partially exploded perspective view of a portion of the system of FIG. 1.

With reference to FIGS. 1, 2, and 4, the at least one LTD 200 of system 100 includes a plurality of toroidal shaped LTD modules 205, 205', 205'', 205''', 205'''', five LTD modules 205 being illustrated in FIGS. 1 and 2. As many LTD modules 205 as desired may be connected to provide the LTD 200 for system 100 with the desired amount of power, or electrical pulses, to power electrodes 201. An LTD is able to create electrical pulses of 100s of kV and 100s of KA over pulse lengths of less than a micro, or nano, second. As shown in FIG. 4, each LTD module includes an induction, or magnetic, core 210 surrounded by a plurality of radially extending capacitors 215 disposed upon a base 216 with each capacitor 215 being controlled by a switch 220, as is known in the art. One of the electrodes 201 is an elongate bar of steel, or any other material with similar electrical and mechanical properties, that extends through the center opening 211 of each magnetic core 210. Upon electric power being supplied to the LTD modules 205, the capacitors 215 are charged and upon being discharged by operation of the switches 220, the desired high energy pulses are provided to the electrodes 201. Upon the operation of the LTD 200, the high energy pulses from the electrodes 201 heat, or ablate, at least a portion of the regolith 901 (FIG. 3) to evaporate and ionize the regolith into the desired high temperature plasma 250 containing metallic ions 251, and other constituent ions, such as silicon.

With reference to FIGS. 1-3, the space resource mining and maneuvering system 100 may be associated with a spacecraft 950 (FIG. 3), as by mounting system 100 to the spacecraft 950. An example of such a spacecraft is the OSIRIS-REX spacecraft launched in 2016. By associating system 100 with spacecraft 950, a system 1000 for space resource and mining upon a planetary body is assembled. At least one pulsed plasma thruster 360 may be associated with the spacecraft 950 or system 100, or with both the spacecraft 950 and the system 100, whereby upon operation of the at least one pulsed plasma thruster, the spacecraft 950 may be maneuvered in space to move from one planetary body to another planetary body, or from one location upon a planetary body to another location on the planetary body, to permit resource mining operations on the planetary bodies or body. Additionally, the system 1000 could have a roving vehicle, or rover, 370 associated with the spacecraft 950 to transport system 100 to the surface of a planetary body.

Electric power for systems 100 and 1000 may be provided by a power source capable of providing the necessary power to systems 100 and 1000 to operate as previously described, such as a battery or batteries, and/or solar panels 960 (FIG. 3). A suitable control system may be provided to control the operation of system 100 and 1000, as are known in the art in connection with the operation of spacecraft, such as spacecraft 960 and satellites.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure.

Use of the terms "optionally" or "preferably" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above, but is defined by the claims that follow, that scope including all equivalents of the subject matter of the claims. Each and every claim is incorporated as further disclosure into the specification and the claims are embodiment(s) of the present disclosure.

While several exemplary embodiments have been provided in the present disclosure, it may be understood that the disclosed embodiments might be embodied in many other specific forms without departing from the spirit or scope of the present disclosure and the appended claims. The present examples are to be considered as illustrative and not restrictive, and the intention is not to be limited to the details given herein. For example, the various elements or components may be combined or integrated in another system or certain features may be omitted, or not implemented.

In addition, the various exemplary embodiments described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A space resource mining and maneuvering system for use upon a planetary body having a layer of regolith, comprising:

at least one linear transformer driver which includes at least two electrodes which can heat at least a portion of the layer of regolith to a temperature high enough to evaporate and ionize the layer of regolith into a high temperature plasma containing metallic ions, and other constituent ions;

a selective ionization plasma pyrolysis extractor having a housing associated with the at least one linear transformer driver, the housing having a first end and a second end, a longitudinal axis, a first portion of the housing adjacent the first end of the housing, and a second portion of the housing intermediate the first end and the second end of the housing, the first end of the housing having an entrance through which the high temperature plasma may enter the housing;

at least two cathodes disposed within the second portion of the housing in a spaced relationship from each other along the longitudinal axis of the housing; and a source of coolant to cool the at least two cathodes, whereby upon the high temperature plasma flowing into and through the housing and contacting the at least two cathodes which have been cooled, a layer of some of the metallic ions in the high temperature plasma solidify and are deposited upon the at least two cathodes.

2. The space resource mining and maneuvering system of claim 1, wherein the temperature is at least 4000K.

3. The space resource mining and maneuvering system of claim 1, wherein the housing is disposed adjacent the linear transformer driver in communication with the entrance to the housing.

4. The space resource mining and maneuvering system of claim 1, wherein a gridded ion accelerator is disposed in the first portion of the housing in communication with the entrance to the housing.

5. The space resource mining and maneuvering system of claim 1, wherein the source of coolant is a coolant manifold in a heat transmitting relationship with the at least two cathodes.

6. The space resource mining and maneuvering system of claim 1, including at least one pulsed plasma thruster associated with the at least one linear transformer driver whereby the space resource mining and maneuvering system may be maneuvered in space by the at least one pulsed plasma thruster.

7. The space resource mining and maneuvering system of claim 1, including an extraction manifold associated with the housing in communication with the second portion of the housing for removal of the metallic ions from the housing.

8. The space resource mining and maneuvering system of claim 1, wherein the high temperature plasma includes other materials which do not solidify upon the at least two cathodes, and the second end of the housing has an exit in communication with a storage container for the other materials.

9. The space resource mining and maneuvering system of claim 1, wherein each cathode of the at least two cathodes is a ring-shaped member disposed within the second portion of the housing and axially spaced from each other along the longitudinal axis of the housing, and each of the ring-shaped members are disposed in a plane which is substantially perpendicular to the longitudinal axis of the housing.

10. The space resource mining and maneuvering system of claim 9, wherein the second portion of the housing has an interior wall surface, and each of the ring-shaped members have an outer wall surface which is disposed adjacent the inner wall surface of the second portion of the housing.

11. The space resource mining and maneuvering system of claim 1, wherein the second portion of the housing has a substantially cylindrical cross-sectional configuration and the first portion of the housing has a cone shaped configuration with an outer wall surface that tapers upwardly from the entrance to the housing.

12. The space resource mining and maneuvering system of claim 1, including a roving vehicle associated with the at least one linear transformer driver and the selective ionization plasma pyrolysis extractor.

13. A system for space resource mining upon a planetary body having a layer of regolith, comprising:
a spacecraft;
at least one linear transformer driver, associated with the space craft, which includes at least two electrodes which can heat at least a portion of the layer of regolith to a temperature high enough to evaporate and ionize the layer of regolith into a high temperature plasma containing metallic ions and other constituent ions;
a selective ionization plasma pyrolysis extractor, associated with the spacecraft, having a housing associated with the at least one linear transformer driver, the housing having a first end and a second end, a longitudinal axis, a first portion of the housing adjacent the first end of the housing, and a second portion of the housing intermediate the first end and the second end of the housing, the first end of the housing having an entrance through which the high temperature plasma may enter the housing;
at least two cathodes disposed within the second portion of the housing in a spaced relationship from each other along the longitudinal axis of the housing; and
a source of coolant to cool the at least two cathodes, whereby upon the high temperature plasma flowing into and through the housing and contacting the at least two cathodes which have been cooled, some of the metallic ions and other constituent ions in the high temperature plasma solidify and are deposited upon the at least two cathodes.

14. The system of claim 13, wherein the temperature is at least 4000K.

15. The system of claim 13, wherein the housing is disposed adjacent the linear transformer driver in communication with the entrance to the housing.

16. The system of claim 13, wherein a gridded ion accelerator is disposed in the first portion of the housing in communication with the entrance to the housing.

17. The system of claim 13, wherein the source of coolant is a coolant manifold in a heat transmitting relationship with the at least two cathodes.

18. The system of claim 13, including at least one pulsed plasma thruster associated with the at least one linear transformer driver whereby the space craft may be maneuvered in space by the at least one pulsed plasma thruster.

19. The system of claim 13, including an extraction manifold associated with the housing in communication with the second portion of the housing for removal of the metallic and other constituent ions form the housing.

20. The system of claim 13, wherein the high temperature plasma includes other materials which do not solidify upon the at least two cathodes, and the second end of the housing has an exit in communication with a storage container for the other materials.

21. The system of claim 13, wherein each cathode of the at least two cathodes is a ring-shaped member disposed within the second portion of the housing and axially spaced from each other along the longitudinal axis of the housing, and each of the ring-shaped members are disposed in a plane which is substantially perpendicular to the longitudinal axis of the housing.

22. The system of claim 21, wherein the second portion of the housing has an interior wall surface, and each of the ring-shaped members has an outer wall surface which is disposed adjacent the inner wall surface of the second portion of the housing.

23. The system of claim 13, wherein the second portion of the housing has a substantially cylindrical cross-sectional configuration, and the first portion of the housing has a cone shaped configuration with an outer wall surface that tapers upwardly from the entrance to the housing.

24. The system of claim 13, including a roving vehicle associated with the at least one linear transformer driver and the selective ionization plasma pyrolysis extractor.

25. A method for space resource mining and maneuvering upon a planetary body having a layer of regolith, comprising:
providing a spacecraft;
associating with the spacecraft at least one linear transformer driver, which includes at least two electrodes;
associating with the spacecraft a selective ionization plasma pyrolysis extractor, having a housing associated with the at least one linear transformer driver, the housing having a first end and a second end, a longitudinal axis, a first portion of the housing adjacent the first end of the housing, and a second portion of the housing intermediate the first end and the second end of the housing, the first end of the housing having an entrance through which a high temperature plasma enters the housing;

providing at least two cathodes within the second portion of the housing in a spaced relationship from each other along the longitudinal axis of the housing; providing a source of coolant to cool the at least two cathodes;

utilizing the at least two electrodes of the linear transformer driver to heat at least a portion of the layer of regolith to a temperature high enough to evaporate and ionize the layer of regolith into a high temperature plasma containing metallic ions and other constituent ions; and cooling the at least two cathodes to solidify and deposit a layer of some of the metallic ions and other constituent ions upon the at least two cathodes as the high temperature plasma flows into and through the housing.

26. The method of claim 25, wherein the temperature is at least 4000K.

27. The method of claim 25, including disposing the housing adjacent the at least one linear transformer driver in communication with the entrance to the housing.

28. The method of claim 25, including providing a gridded ion accelerator in the first portion of the housing in communication with the entrance to the housing.

29. The method of claim 25, including utilizing as the source of coolant a coolant manifold in a heat transmitting relationship with the at least two cathodes.

30. The method of claim 25, including providing at least one pulsed plasma thruster associated with the at least one linear transformer driver, whereby the space craft may be maneuvered in space by the at least one pulsed plasma thruster.

31. The method of claim 25, including providing and associating an extraction manifold with the housing with the extraction manifold in communication with the second portion of the housing for removal of the metallic ions and other constituent ions from the housing.

32. The method of claim 25, wherein the high temperature plasma includes other materials which do not solidify upon the at least two cathodes, and providing the second end of the housing with an exit in communication with a storage container for the other materials.

33. The method of claim 25, including utilizing a ring-shaped member for each cathode of the at least two cathodes, and disposing the at least two cathodes within the second portion of the housing axially spaced from each other along the longitudinal axis of the housing, and disposing each of the ring-shaped members in a plane which is substantially perpendicular to the longitudinal axis of the housing.

34. The method of claim 33, wherein the second portion of the housing has an interior wall surface, and each of the ring-shaped members has an outer wall surface, and disposing each of the ring-shaped members adjacent the inner wall surface of the housing.

35. The method of claim 25, including providing the second portion of the housing with a substantially cylindrical cross-sectional configuration and providing the first portion of the housing with a cone shaped configuration with an outer wall surface that tapers upwardly from the entrance to the second portion of the housing.

36. The method of claim 25, including associating a roving vehicle with the at least one linear transformer driver and the selective ionization plasma pyrolysis extractor.

* * * * *